Dec. 1, 1964  C. E. ROGERS  3,159,340
APPARATUS FOR DETERMINING AND EXPRESSING RATE
Original Filed Feb. 5, 1957  2 Sheets-Sheet 1

INVENTOR.
CHARLES E. ROGERS
BY Ely, Frye & Hamilton

ATTORNEYS

Dec. 1, 1964  C. E. ROGERS  3,159,340
APPARATUS FOR DETERMINING AND EXPRESSING RATE
Original Filed Feb. 5, 1957  2 Sheets-Sheet 2
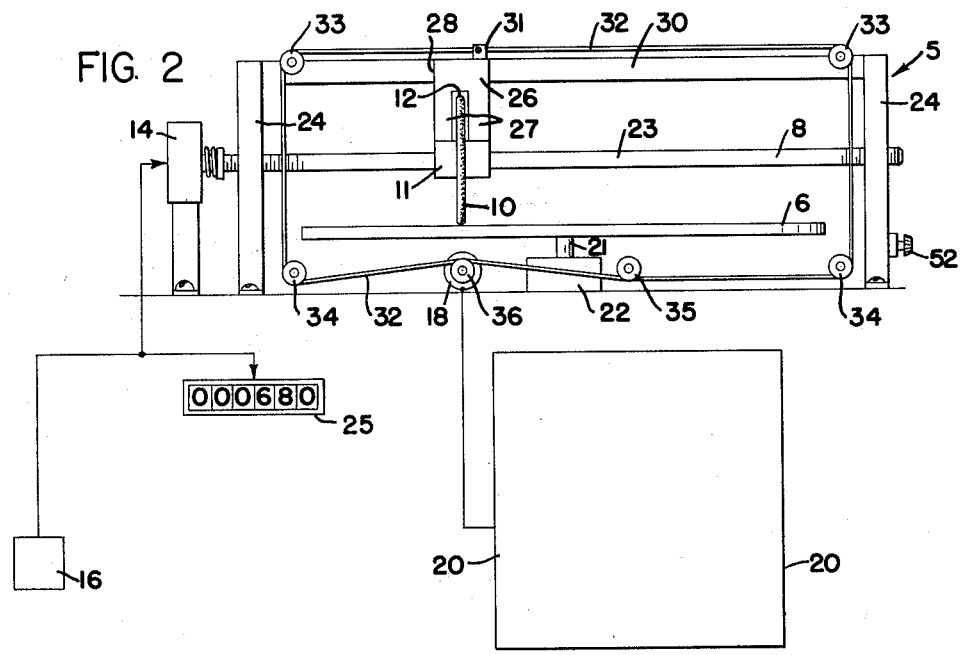
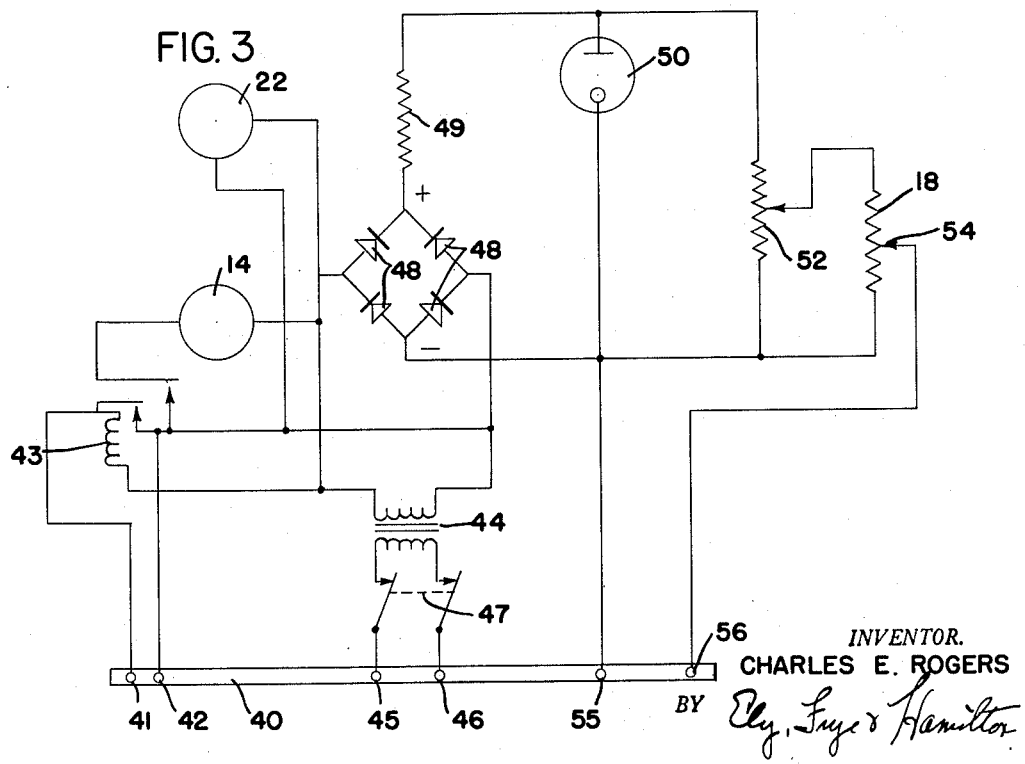
INVENTOR.
CHARLES E. ROGERS
BY
ATTORNEYS

United States Patent Office 3,159,340
Patented Dec. 1, 1964

3,159,340
APPARATUS FOR DETERMINING AND
EXPRESSING RATE
Charles E. Rogers, 612 Cliffside Drive, Akron, Ohio, assignor of one-half to John E. Ake, Akron, Ohio
Continuation of application Serial No. 638,399, Feb. 5, 1957. This application July 17, 1962, Ser. No. 211,945
2 Claims. (Cl. 235—61)

The present invention relates to the determination and expression of rate. More particularly, the invention relates to apparatus for determining the quantity or degree of an intermittent, digital event or measurable phenomenon per unit of reference quantity and expressing same as an analogue value.

Any event or phenomenon which can be detected can also be expressed as a numerical quantity, that is, counted. Suitable devices or instruments for detecting or signaling the occurrence of a phenomenon range in complexity from a manually-operated push button to radar. The fact of such occurrences, when detected, may be transmitted to and recorded on suitable indicator. The numerical values thus determined have data significance. However, there are many situations where an expression of rate, that is, the ratio between the quantity measured and a reference quantity, is desired. Such a rate determination, expressed as an analogue or electrical value, has many potentially useful applications.

It is therefore an object of the invention to provide improved apparatus for determining the rate of phenomena occurrence.

Further, it is an object to provide apparatus for determining rate which will operate in combination with a means for detecting the fact of phenomena occurrence, and express the determined rate as an analogue value.

These and further specific objects of the invention will be apparent in view of the following detailed description thereof taken in conjunction with the attached drawings.

In the drawings:

FIG. 2 shows the apparatus of FIG. 1 in elevation; and

FIG. 3 is a schematic view of one form of electrical circuit according to the invention.

Figure 1:
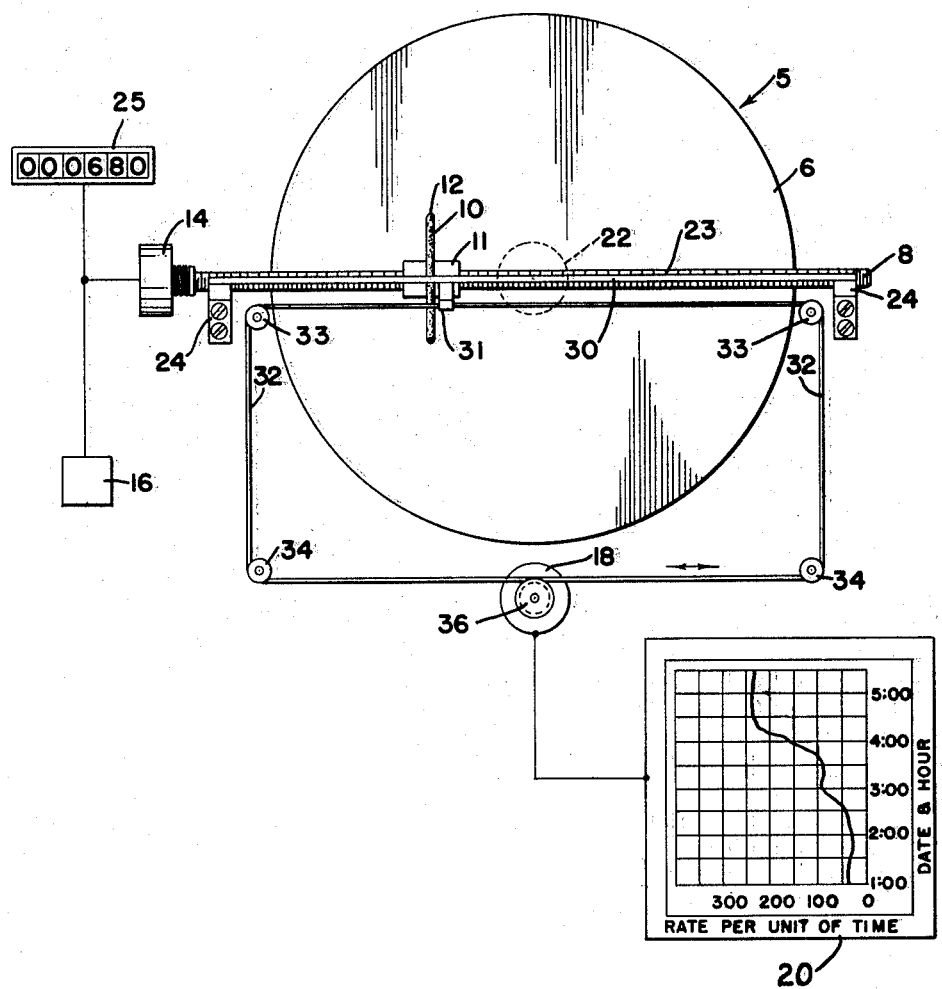
FIG. 1 is a plane schematic of apparatus embodying the invention.

A form of apparatus embodying the invention is indicated generally by the numeral 5. The essential elements of such apparatus are: an axially mounted relatively large diameter disc 6; a threaded shaft 8 mounted radially of the rotational axis of the disc 6; and, a smaller diameter disc 10 provided with a threaded axial hub 11, continuously engaging the threaded shaft 8, and an outer surface 12 in continuous frictional contact with the disc 6.

The large disc 6 is rotated to provide a mechanical force against the outer surface 12 of the small disc 10. The speed of rotation (R), at a preselected number of revolutions, functions as the reference quantity; that is, the denominator of a rate calculation. The threaded shaft 8 is rotated a predetermined number of degress of each occurrence of the phenomenon being detected so that the angularly displaced shaft threads provide a mechanical force against the hub 11 of the small disc 10. The angular rotation (A), for each phenomenon occurrence, functions as the numerator of a rate calculation. The large disc 6 is preferably rotated so as to drive the small disc 10 toward the center of disc 6. The shaft 8 is preferably rotated so as to drive the small disc 10 toward the rim of disc 6. In any event, the two mechanical forces must act in opposition to each other upon the disc 10.

The surface of disc 6 may be regarded as having an infinite number of concentric circles thereon. The circumference of each such circle will have a different linear speed. The radius ($x$) of each such circle, expressed in terms of ratio of distance from the center of disc 6 to its outer rim, is $x/100$. The rotational speed (R) of the disc 6 is constant for any given rate determination. The degree of rotation (A) of the shaft 8 for each phenomenon occurrence is constant but the total degrees of rotation per each revolution of the disc 6 is determined by the total number ($i$) of phenomenon occurrence. Thus, for every given rate there will be an imaginary circle on the disc 6 having a radius ($x$), the circumference of which has a linear speed exactly matching the linear speed of disc 10 necessary to maintain an in balance condition relative to the shaft 8. The disc 10 will always be positioned at such equilibrium point and will indicate the rate. If the rate increases, the disc 10 will move toward the rim of disc 6; if the rate decreases, the disc 10 will move toward the center of disc.

The radius ($x$) of the imaginary circle on disc 6, that is, the point at which the forces provided by disc 6 and shaft 8 are in equilibrium, is determined by the following equation.

$$(a) \quad \frac{xDR}{100d} = \frac{Ai}{360}$$

which solves as $$(b) \quad x = \frac{5dAi}{18DR}$$

where:

D equals inches diameter of the large disc 6,
R equals revolutions per reference quantity of disc 6,
d equals inches diameter of the small disc 10,
A equals degrees of angular rotation of the shaft 8 for each phenomenon occurrence, and
$i$ equals total number of phenomenon occurrences for each revolution of disc 6.

The shaft 8 is actuated by a means 14 which will impart to the shaft the predetermined degree of rotation for each occurrence of a phenomenon. The means 14 is signalled to rotate shaft 8 by a remotely located phenomena detecting means 16. Electrical means 18 which are responsive to the equilibrium position of disc 10 expresses the rate of phenomena occurrence as an electrical signal having an analogue value which may be recorded by a suitable instrument 20.

Referring to FIGS. 1 and 2, the disc 6 is axially mounted on the output shaft 21 of an electric motor 22. The motor 22 is preferably a synchronous type and is provided with either suitable controls or gearing, or a combination of both, to enable the operator of the apparatus to select the output r.p.m.

The shaft 8 is threaded preferably with a continuous fine thread 23, the number of threads per inch being determined by the sensitivity or speed of response desired. Both ends of the shaft 8 are journaled in stanchions 24, set 180° apart on opposite sides of the disc 6, so that the longitudinal axis of the shaft intersects the rotational axis of the disc at substantially a right angle. The shaft 8 is actuated by a suitable means 14 which is mechanically coupled thereto. The means 14 is preferably an electrically driven device such as a ratchet type rotary solenoid or an electric motor, with or without suitable intermediate gearing and means to terminate its operating cycle. The actuating means 14 is provided with suitable controls to enable the operator of the apparatus to select the degree of rotation to be imparted to the shaft 8 for each occurrence of a phenomenon detected by the means 16.

Within the spirit of the invention, the detecting means 16 may be any device or instrument, or combination of devices, which will sense the occurrence of the phenomenon being measured and transmit a signal impulse, either directly to the actuating means 14 or through intermediate relays or amplifiers, indicating each occurrence of the phenomenon. Examples of suitable detecting means include: a fluid filled tube for determining the rate of automobile traffic; photoelectric-cells sensing the passage of solid objects; beta-ray gauges for sensing variations in density of sheet material; etc. If desired, the signal from the detecting means 16 may also be fed into a counter or totalizer 25 so that the mere number of phenomenon occurrences will be visually indicated.

In the form of apparatus shown and described herein, the disc 10 is provided with a bracket 26 having clevis-like lower ends 27 rigidly attached to the disc hub 11 and an upper flange 28 slidably supported on a cross bar 30. The bar 30 is affixed at either end to a stanchion 24. Attached to the bracket 26, above the cross bar 30, is a clip 31. A dial cord 32 is connected to the clip 31 and is trained through a first pair of pulleys 33, at the upper end of the stanchions 24, a second pair of pulleys 34 adjacent the lower end of the stanchions, and an intermediate pulley 35 located beneath the disc 6 adjacent the motor 22. As described elsewhere herein, the rate of phenomena occurrence is expressed by the equilibrium position of the disc 10. The dial cord 32 is connected to an electrical means 18 located beneath the disc so that the position of the disc 10 will be expressed as a setting on the electrical means 18.

Within the spirit of the invention, the electrical means 18 may be any device or instrument, or combination of devices, which is adjustable so as to alter the characteristics of an electrical current, being transmitted to a recording means 20. In the apparatus of FIGS. 1 and 2, the electrical means 18 is a potentiometer having a wiper arm pulley 36 connected to the dial cord 32. Other electrical devices which will transmit an analogue value, such as a servo-mechanism, could also be used. The electrical means 18 could also be a calibrated meter which, when set in a suitable manner by the disc 10, could be read directly in terms of rate of phenomena occurrence. If desired, the dial reading of such a meter could be transmitted through a closed circuit television to a remotely located receiver.

The recording means 20 may be any known device or instrument, or combination of devices, which will respond to the analogue signal from the electrical means 18 and provide either an instantaneous indication or a permanent record. The recording means 20 is synchronized with the disc 6, either mechanically or electrically, so that the analogue signal from the electrical means 18 and the reference quantity as established by the rotation of the disc 6, will be of the same order of magnitude.

An electrical circuit for use with the mechanical elements of the apparatus is shown schematically in FIG. 3. In addition to the shaft actuating means 14, the disc drive motor 22 and the electrical means 18 (or potentiometer 36), the circuit includes a terminal strip 40. The detecting means 16 is connected to the terminals 41 and 42 and energizes a holding relay 43 that energizes the shaft actuating means 14 such as a fractional horsepower electric motor. If a rotary solenoid is used as the means 14, the relay 43 would not be required. The current for operation of the actuating means 14 and the synchronous motor 22 is supplied from a transformer 44. Power to the transformer is supplied from terminals 45 and 46 and controlled by a switch 47.

The rate determining and indicating portion of the circuit of FIG. 3 preferably utilizes a direct current voltage which more readily lends itself to precise regulation. The transformer 44 supplies an alternating voltage to a bridge network utilizing selenium rectifiers 48. The rectified voltage passes through a limiting resistor 49 in series with a gas type voltage regulator tube 50. The resistor plus the tube will always equal the output of the rectifiers 48 and thus ensure a constant voltage being applied to a calibrating potentiometer 52.

The operator adjusts the setting of the potentiometer 52 (see also FIG. 2) to determine the voltage applied to potentiometer 36, and thus is able to locate the indicating element of a recording means 20 at any desired position relative to the position of disc 10. The wiper arm 54 of the potentiometer 18 is positioned by disc 10, in a manner such as described above, and the proportionate voltage thus selected is supplied to the output terminals 55 and 56. The recording means 20 is connected to the terminals 55 and 56.

Apparatus according to the invention may be utilized, for example, to determine and record the rate of traffic flow through an intersection. The sensing means 16 would be a fluid filled tube placed across the roadway and equipped with a relay so that each car passing thereover would signal the shaft actuating means 12. The recording means 20 would be a continuous chart instrument plotted as number of units vs. time in hours.

As described above, the operator of the apparatus would use potentiometer 52 to locate the indicating element of the recording means 20 at a reference point. It would also be desirable for the operator to set the apparatus so that for an "average rate of phenomena occurrence," the equilibrium position of the disc 10 would be midway between the center of the disc 6 and its rim. Such a midway setting is determined by the following equation:

$$(c) \qquad \frac{DR}{2d} = \frac{Ai}{360}$$

where D, R, A and d are expressed as described above and i equals the average number of phenomena occurrence for each revolution of the disc 6.

Assume that a preliminary survey indicates that at rush hours 240 cars per hour passed over the indicating means. Assume also that under normal conditions only 60 cars per hour passed. Thus, the average number of phenomena occurrence per hour would be 150. Assume also that the disc 6 is 10 inches in diameter, the shaft 8 rotates 90° for each impulse from the detecting means 16, and the diameter of disc 10 is 2 inches.

The Formula c solves for R as $$(d) \qquad R = \frac{dAi}{180D}$$

Using the exemplary values set forth above $R=15$. Thus, the motor 22 should be adjusted to rotate the disc 6 at 15 revolutions per reference quantity, which in this case is one hour. Potentiometer 52 is also adjusted so that the indicating element is located at a point on the chart of recording means 20 equivalent to the quantity 150. Also, as described above, movement of the chart through the recording means 20 is synchronized so that for 15 revolutions of the disc 6 the chart will move the equivalent of one hour.

When the rate of traffic flow increases, the setting of potentiometer 36 will be changed to transmit a higher voltage to the recording means 20. When the rate decreases, a lower voltage will be transmitted to the recording means 20. Throughout the entire recording period, a continuous record of the rate of traffic flow past the detecting means 16 will be made.

The fundamental concepts of the invention and specific embodiments thereof have been shown and described. It it also apparent that minor modifications and changes in the essential elements of the invention could be made therein without departing from the spirit of the invention as expressed in the claims. For example, a plurality of shafts 8 each carrying a disc 10, could be supported radially of the axis of rotation of a single disc 6, and could determine and indicate a plurality of rates, so long as the reference quantities were of the same order of magnitude.

Also, pneumatic or mechanical means could be used to "read" or determine the position of the disc 10 on the cross bar 30. The setting of the disc 10 could even be read directly if the cross bar 30 were suitably calibrated. Also, an analogue signal from the electrical means 18 could be used as a source of feedback information for an automated control system. Still other uses for the invention will suggest themselves to those skilled in the art.

What is claimed is:

1. A combination electro-mechanical computing apparatus for producing a continuous electrical analog output signal comprising, a first axially mounted rotatable disc, means for rotating said first disc at a preselected number of revolutions per reference quantity, stanchions on opposite sides of said first disc, a threaded shaft journaled in said stanchions so that the longitudinal axis of said threaded shaft intersects the rotational axis of said first disc at substantially a right angle, the axis of said threaded shaft being disposed in a plane spaced apart from and parallel to a plane defined by said first disc, a bar connected to said stanchions above said shaft, means for detecting digital quantities and intermittent phenomena and converting said quantities and phenomena into electrical signals, signal responsive means for rotating said threaded shaft through a preselected degree of angular displacement for each phenomenon occurrence, a second disc having an axial portion continuously engaging the threads of said shaft and a peripheral portion continuously engaging a surface of said first disc, the relative position of said peripheral portion of said second disc continuously changing with respect to said rotational axis of said first disc in response to said angular displacement of said threaded shaft whereby said digital quantities and intermittent phenomena are continuously electro-mechanically differentiated with respect to said reference quantity, a bracket slidably supported on said cross bar and attached to the hub of said second disc, and potentiometer means operatively associated with said bracket to continuously transmit an electrical analog output signal which is an analog of said changing position of said second disc, whereby said electrical output signal is a continuous analog of the variable rate of digital quantities and intermittent phenomena per reference quantity.

2. Combination apparatus, according to claim 1, said apparatus further comprising, means for continuously recording said electrical analog output signal.

References Cited in the file of this patent

UNITED STATES PATENTS

| | | |
|---|---|---|
| 2,511,104 | Eddy | June 13, 1950 |
| 2,935,311 | Kabelitz | May 3, 1960 |

UNITED STATES PATENT OFFICE
CERTIFICATE OF CORRECTION

Patent No. 3,159,340　　　　　　　　　　　　　　December 1, 1964

Charles E. Rogers

It is hereby certified that error appears in the above numbered patent requiring correction and that the said Letters Patent should read as corrected below.

Column 1, line 21, before "suitable" insert -- a --; line 40, for "plane schematic" read -- plan schematic --; line 62, for "of each" read -- for each --.

Signed and sealed this 1st day of June 1965.

(SEAL)
Attest:

ERNEST W. SWIDER　　　　　　　　　　　　　　　EDWARD J. BRENNER
Attesting Officer　　　　　　　　　　　　　　　Commissioner of Patents